Nov. 7, 1961  V. RAWLS  3,007,251
METHOD AND APPARATUS FOR MEASURING THE
SIZE OF PNEUMATIC TIRE CASINGS
Filed Dec. 19, 1960  4 Sheets-Sheet 1
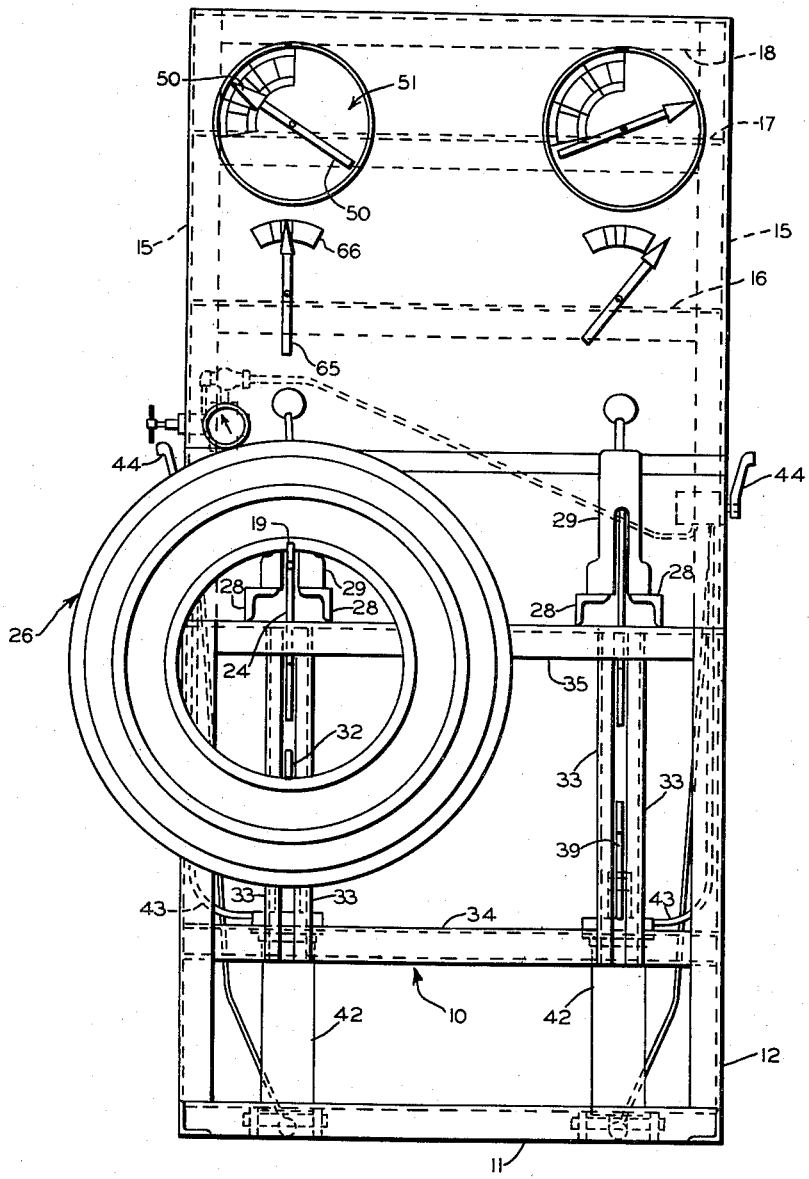
Fig. II.
INVENTOR.
VAUGHN RAWLS
BY Owen+Owen
ATTORNEYS

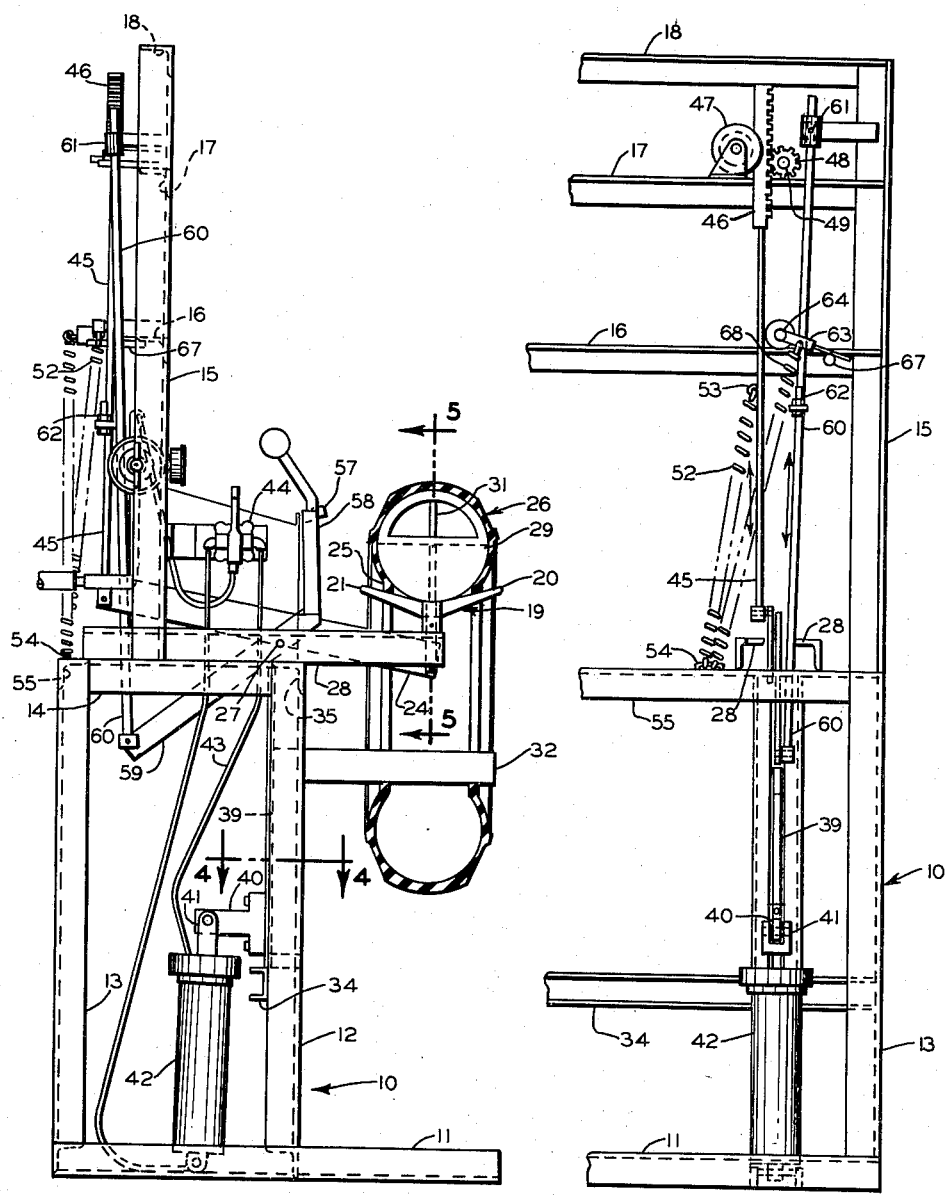

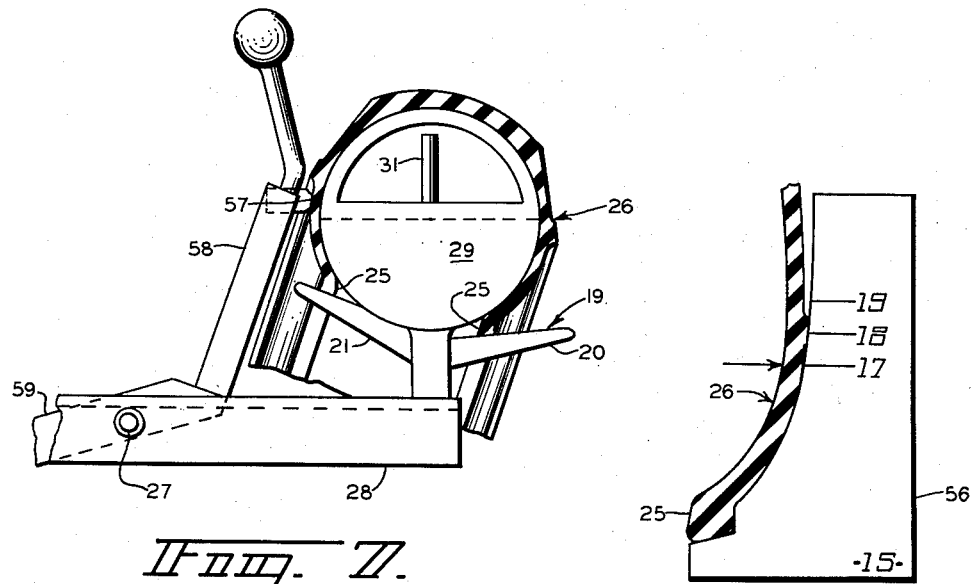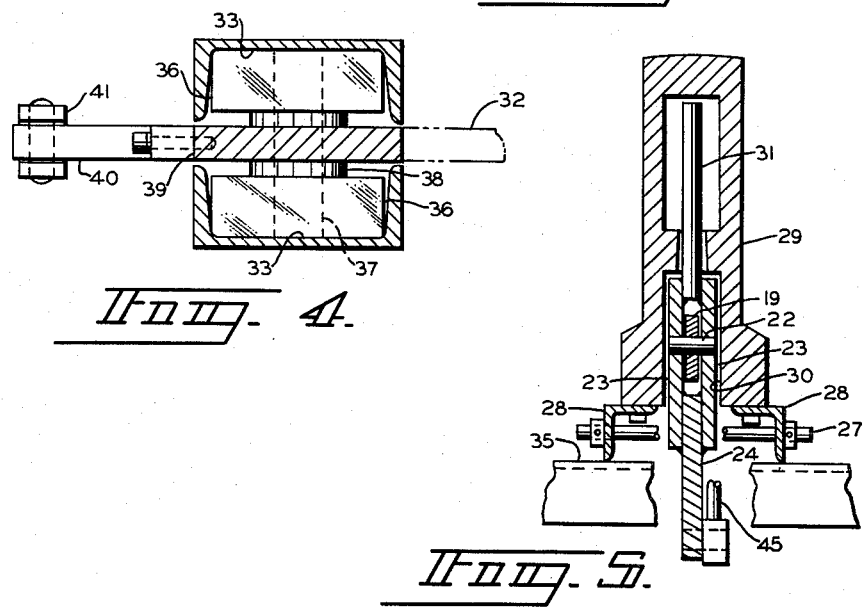

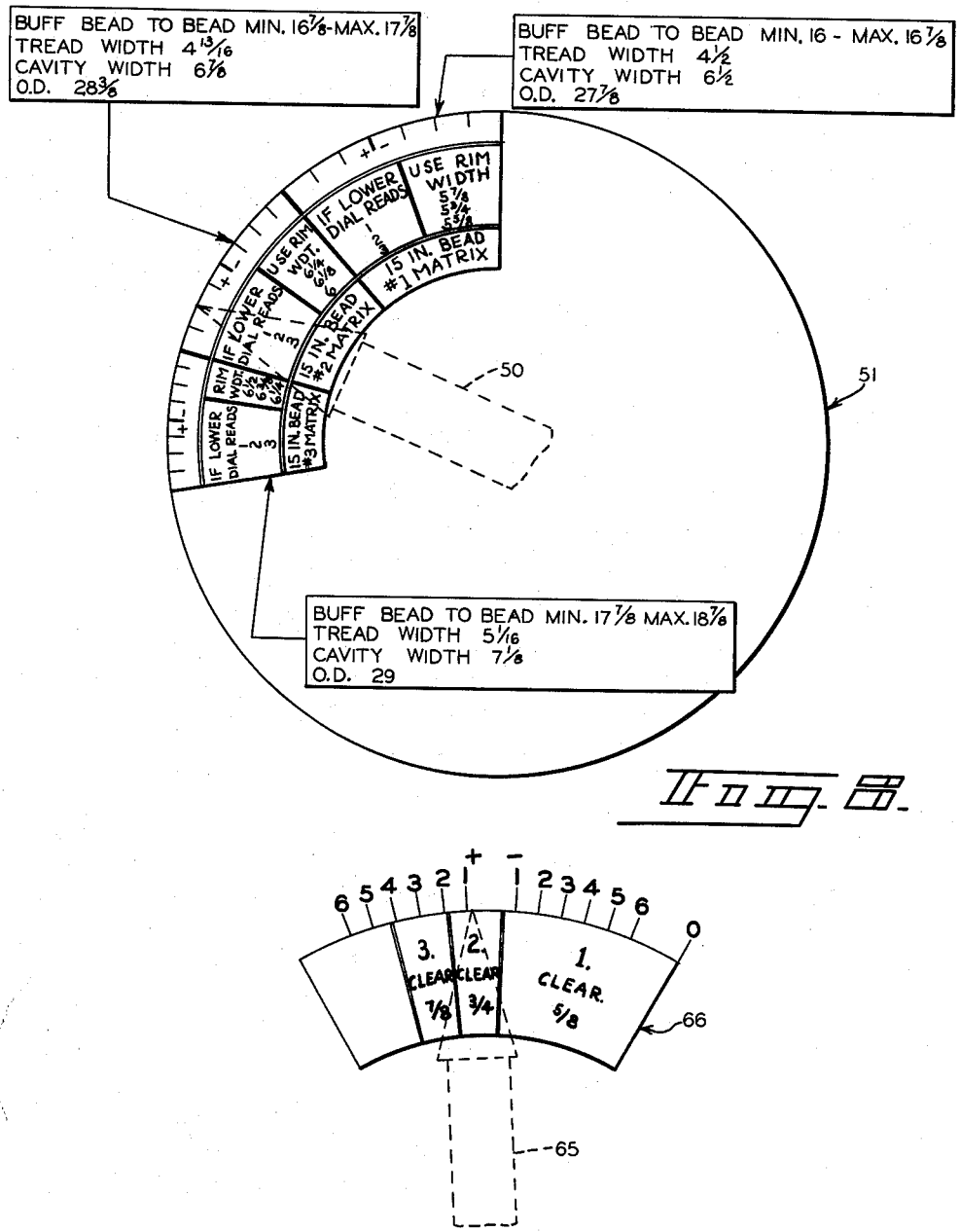

United States Patent Office 3,007,251
Patented Nov. 7, 1961

3,007,251
METHOD AND APPARATUS FOR MEASURING THE SIZE OF PNEUMATIC TIRE CASINGS
Vaughn Rawls, Lima, Ohio, assignor to Rawls Brothers Company, Lima, Ohio, a corporation of Ohio
Filed Dec. 19, 1960, Ser. No. 76,876
9 Claims. (Cl. 33—178)

This invention relates to a method and an apparatus for measuring the size of pneumatic tire casings in order to determine the correct dimensions to which a casing to be retreaded should be buffed and to aid in the selection of the proper size matrix for molding the new tread on the casing.

While automobile tire sizes have become reasonably standardized in so far as their nominal dimensions are concerned, the standardization including three rim sizes, i.e., 13″, 14″ and 15″, and a few nominal diameters through the bodies of the casings themselves for each rim size, the tires produced and marked with these standardized sizes very frequently are not actually the sizes they are marked. This disparity between marked sizes and actual sizes of pneumatic tire casings may result from any one or more of several factors.

(1) Many tire casings are reinforced with large numbers of cords of nylon or rayon embedded in their bodies. During operation of a motor vehicle, particularly at high speed, great heat is generated in the body of such a tire which softens the material from which the cords are made. When the tire heats up the cords soften and the pressure of the air is raised so as to gradually stretch the cord increasing the actual diameter through the body of the tire frequently to a point substantially larger than its normal diameter.

(2) Many tires, particularly those having nylon cords are "post-inflated" which means simply that immediately after molding of the tire, it is placed upon a rim and filled with air under considerable pressure in order to stretch the cords of the tire so as to eliminate their subsequent stretching or sagging. Again, obviously, two tires marked with the same size may differ substantially in actual size because one may have been "post-inflated" and the other one not so treated, or both may have been "post-inflated", but one under conditions different from the other.

(3) Some manufacturers deliberately undersize their tires, marking a smaller tire with a larger size and thus reducing the quantity of the rubber needed to manufacture the tire. An undersized tire of a certain nominal size can this way be sold at a price less than other similar marked tires which are made to full dimensions.

(4) Some manufacturers deliberately "up size" or "over size" their tires in order to provide on a tire of a certain marked size, a larger area of tread, and, thus a better road gripping power, or an opportunity to promote a special tread, such as a snow tread.

Because of these several manufacturing problems and deliberate actions in fabricating tires to a size different from their markings, used tires as brought to a retread shop may have had any or several of these factors in their histories. As a result, two tires selected at random and bearing the same nominal size markings may differ as much as an inch or more in their actual outside dimensions or in their diameters through the tire body parallel to the axis of the tire. Even if it were possible for a tire retreading shop to keep an indefinite number of matrices for each tread design, there would be problems of fitting the tire to a matrix of the right size so as to properly mold a new tread on the casing. However, because this is physically impossible, matrices for each new tire tread design are made in only enough sizes so as to accommodate the standard sizes of pneumatic casings.

The controlling size of a particular matrix should be the sum of the rim diameter plus two times the body diameter. For example, a 7.50 x 14 tire measures 14 inches diametrically between the rim beads and the body of the tire as 7.50 inches in diameter so that the outside diameter of such a tire should be 14 plus 2 times 7.50 or 29 inches. Similarly, a 7.10 x 15 tire should have an outside diameter of 29.2 inches. But this is true, of course, only if the tires are actually made to their marked sizes.

A further important consideration in determining what matrix should be used for molding a new tread is the distance which the tread pattern extends down around the tire casing shoulder from the tread toward the rim. Some tread designs extend downwardly so far as to actually include the "curb-guard," or "beauty rib", while others stop short of these tire elements. In a curing mold for retreading the tire, internal pressure must be applied to the casing by a curing bag which is substantially identically with an inner tube. The curing bag or inner tube must be backed up with a curing rim which is inserted into the casing after the bag is inserted and which prevents the bag from expanding inwardly from the tire when air is fed into the bag with sufficient pressure to squeeze the casing firmly outwardly to force the new tread rubber into the configurations of the matrix for the tread and tightly against the old rubber surface on the casing so as to produce a good vulcanized bond. The selection of a rim bead of proper diameter is not difficult since it is determined by the tread design but the axial width of such a curing rim is also critical because the axial distance between the opposed walls of the matrix is fixed and that space must accept the curing rim width and the two walls of the casing to be retreaded, without either pinching the curing bag or the casing walls or allowing the bag to blow out between the edges of the curing him and the casing walls. Many efforts have been made to devise fool-proof systems for the measuring of the actual size of a tire casing, first, to determine how its surface should be buffed prior to retreading and, second, to control the selection of the size of the matrix in which it is to be retreaded and the width of the curing rim to be employed, in order to properly retread the tire. These systems have included measuring from one rim bead of the casing around the exterior of the casing to the other rim bead, as for example, by stretching a string around the tire casing and then measuring the string. This is not certain because the measurement is made before the tire casing is buffed and the buffing action removes some of the old rubber from the outer surface of the tire. Thus the tire should not be buffed to a final size until after its size is determined. Such a measurement can be, at best, an educated guess.

It is the principal object of the present invention to provide a method and apparatus for measuring the size of a pneumatic tire casing before buffing so as to provide information by which the amount of rubber to be removed by buffing is determined and by which the matrix proper for the actual size of the tire and the curing rim to be used can be selected.

It is another object of the instant invention to provide a method of measuring a pneumatic tire casing with respect to its exterior dimension by measuring the actual interior size of the casing.

It is still another object of the instant invention to provide an apparatus by the use of which the actual size of a tire casing can be measured including the sum of its rim diameter and the internal diameter of the tire casing body itself, as well as the measurment of the thickness of the wall of the tire casing at a point adjacent to the curing rim to be used with the matrix selected as a result of the measurement.

These and other more specific objects and advantages of a method and an apparatus embodying the invention will be better understood by reference to the following specification and to the drawings in which:

FIG. 1 is a view in front elevation of a dual machine embodying the invention and suitable for carrying out the method of the invention, the machine being illustrated with a tire casing mounted thereon on one of its units and the other unit not in use;

FIG. 2 is a view taken from the left side of FIG. 1 with the machine housing removed and a tire casing in vertical section illustrating how the casing is supported on the machine according to the invention;

FIG. 3 is a fragmentary rear view in elevation of the apparatus shown in FIG. 2, illustrating the linkages for actuating certain indicator means;

FIG. 4 is a fragmentary, horizontal view taken along the line 4—4 of FIG. 2 and shown on an enlarged scale;

FIG. 5 is a fragmentary vertical, sectional view taken along the line 5—5 of FIG. 2 and shown on an enlarged scale;

FIG. 6 is a fragmentary view in elevation of a gauge employed according to the invention for determining the position of a curing rim relative to the tire to be measured;

FIG. 7 is a fragmentary vertical, sectional view illustrating how the thickness of the wall of a tire casing is measured according to the invention;

FIG. 8 is a chart suitable for use in an apparatus embodying the invention in connection with the stage of measuring the actual size of the tire casing under consideration and selecting the matrix to be employed for the retreading operation;

FIG. 9 is a second chart utilized in connection with the chart of FIG. 8 upon which the measurement taken according to FIGS. 6 and 7 is reflected to indicate the proper curing rim to be employed.

The method of the invention may be carried out in a number of different ways and the apparatus of the invention consists of a structure particularly to facilitate the carrying out of the method, but is not intended to be the only apparatus upon which the method can be carried out. The apparatus illustrated in FIGS. 1–5 is designed to facilitate the measuring of the actual size of a casing under consideration and to directly indicate the matrix to be employed.

The apparatus comprises a framework generally indicated at 10 which includes a base 11, two sets of vertical frame members 12 and 13, a shelf bracket 14, upper side member 15 and cross members 16, 17 and 18. The apparatus illustrated in FIG. 1 is a dual unit apparatus and consists of two apparatuses designed according to the invention. These apparatuses may both be actuated from a single source of air under pressure and the dual nature of the apparatus facilitates the handling of a larger number of tire casings than would be possible with a single unit apparatus. However, each of the two units is substantially identical with the other so that a detailed description of one will suffice for both.

Operative parts of an apparatus embodying the invention include a support yoke 19 having two opposed angularly extending arms 20 and 21 pivotally mounted by a pin 22 (FIG. 5) between a pair of small plates 23 which are welded or otherwise secured on the front end of a rocker 24. The yoke 19 is adapted to engage rim beads 25 of a tire casing 26 shown in place in FIGS. 1, 2 and 7.

The rocker 24 swings in a vertical plane on a transverse pivot pin 27 which extends across through a pair of spaced horizontal angle irons 28 which are rigidly welded to the upper surfaces of cross members of the shelf bracket 14 and which protrude forwardly therefrom. A circular mandrel 29 is bolted to the flat webs of the angle irons 28 at their forward end and is bifurcated at its lower side forming a slot 30 in which the rocker 24 moves up and down as guided by a vertical strut 31 welded to the tops of the plates 23.

The diameter of the mandrel 29 is selected so as to fit reasonably closely to the inner surface of a group of tire casings of either the larger or smaller dimensions standard to tire casings. The nominal diameters of pneumatical tires may be tabulated as follows:

| Rim diameter: | Casing diameter |
|---|---|
| 13″ | 6.00 |
|  | 6.50 |
|  | 7.00 |
| 14″ | 7.50 |
|  | 8.00 |
|  | 8.50 |
|  | 9.00 |
|  | 9.50 |
| 15″ | 6.40 |
|  | 6.70 |
|  | 7.10 |
|  | 7.60 |
|  | 8.00 |

The mandrel 29 at the left of FIG. 1 might be 6 inches in diameter and be suitable for use in tire casings from 6.00 through 7.50. The right hand one of the mandrels 29 might be 7.50 in diameter and be suitable for use for casings from 7.60 to 9.50. The precise fit of the mandrel 29 in the interior of a particular casing is not critical. Its function is to provide a rigid base point from which the tire casing may be measured, as will be explained.

A pressure bar 32 extends horizontally forwardly between a pair of spaced vertical tracks 33 which extend between the cross frame member 34 and a front cross member 35 supported by the shelf bracket 14. The tracks 33 guide the vertical movement of a pair of slides 36 (FIG. 4) carried by a pin 37 which extends through spacing collars 38 and the pressure bar 32. The pressure bar 32 is connected by a vertical strut 39 to an arm 40 yoked by a clevis 41 to the upper end of the rod of a pneumatic cylinder 42. When air is admitted to the upper end of the cylinder 42 through a pipe 43 by a control valve 44, the rod of the cylinder 42 is pulled inwardly pulling downwardly on the strut 39 and pressure bar 32. As can best be seen by reference to FIG. 2, when the tire casing 26 is in position on the mandrel 29 and with its rim bead 25 resting on the arms 20 and 21 of the yoke 19, downward movement of the pressure bar 32 pulls against the rim beads 25 of the casing 26 snugly, urging the inner wall of the casing tightly into contact with the mandrel 29 at the base measurement point determined by the uppermost part of the peripheral surface of the mandrel 29. Because the rim beads of tire casings are reinforced with heavy steel wires, the rim bead 25 does not stretch or distort to any appreciable degree under the pressure applied by the pressure bar 32. Therefore the downward movement of the rim bead 25 relative to the mandrel 29 is utilized to measure the actual diameter of the body of the casing and indicator means are so set up as to convert the summation of the rim bead diameter (e.g. 14″) plus two times the casing diameter (e.g. 7.50″) into an indication of the matrix to be employed, (e.g. 14+2 x 7.50=29″).

The rear end of the rocker 24 (FIGS. 2 and 3) is pivotally connected to the lower end of a rack rod 45 at the upper end of which is mounted a rack 46. The rack 46 is guided for vertical movement by a roller 47 having a slotted periphery and which is journalled on the cross member 17. The rack 46 is engaged with a pinion 48 pinned on the rear end of a main indicator shaft 49. An indicator 50 (FIG. 1) is secured on the front end of the shaft 49 in position to sweep over an arcuate chart generally indicated by the reference number 51 and shown in detail in FIG. 8. A spring 52 (FIG. 3) is connected between an eye 53 on the rack rod 45 and a catch 54 on a cross frame 55 of the shelf supported by the bracket 14. The spring 52 pulls downwardly on the rack rod 45 and, through the rocker 24, thrusts the yoke 19 upwardly to keep its arms 20 and 21 in contact with the rim bead 25 of the tire casing 26. Therefore, the indicator 50 moves angularly a distance proportionate to the distance which the rim head 25 moves radially downwardly when the pressure bar 32 is pulled downwardly to tightly pull the tire casing 26 around and into contact with the mandrel 29.

As has been previously explained above, different tread designs have "wing" portions which extend inwardly around the shoulders and sides of a tire casing to varying distances toward the rim beads. Each tread design requires a number of mold matrices having different overall diameters and inner dimensions axially of the tire, for the molding of the exact same tread pattern on tires of different sizes. Because the tread areas of tire casings of different overall diameters to be supplied with the same tread pattern, must all be squeezed tightly against the matrix surfaces, it is necessary that curing bags be positioned in the interior of tire casings so as to apply pressure to the correct portions of the internal surfaces of the casings during curing. It is conventional to support such curings bags by collapsible curing rims and because of the differences in the overall diameters of the casings and matrices, curing rims of different diameters must also be employed. The particular diameter of a curing rim for a particular matrix having a certain maximum diameter, is determined by the tread design and specifically by the matrix manufacturer. For example, in a matrix intended for the molding of tires having outside maximum diameters of say 28.4 inches, i.e., 6.70 x 15, and of a particular tread design, it might be necessary to employ a curing rim having a diameter of 17 inches. For a larger tire of the same tread design, say a tire having an outside diameter of 31 inches, e.g., 8.00 x 15, or 8.50 x 14, it might be necessary to employ a curing rim having a diameter of 19 inches. However, as previously explained above, in tires of different sizes, the axial dimension between the inner walls of the tire casing at the curing rim diameter is critical and of course will vary depending upon the thickness of the side walls of the particular casing under consideration. For this reason, curing rims are provided having three different widths in each diameter. If too much clearance exists between the edges of a curing rim and the inner surfaces of a casing in a matrix, when air is supplied to the curing bag supported by the curing rim, it may blow out through the clearance. Conversely, if the width of the curing rim is too great, so that it touches or bits into the inner surface of the side walls of the casing, it binds the casing between its edges and the inner surface of the matrix, preventing the casing from freely moving and adjusting its position in the matrix.

The method and apparatus of the invention thus includes the step and the provision of means for measuring the thickness of the side wall of a casing at the diameter of the curing rim. This step is accomplished by the utilization of the means illustrated particularly in FIGS. 6, 7 and 9. For each rim bead dimension, i.e., 13", 14" and 15", there is provided a gauge 56 (FIG. 6) that gauge for 15" rim bead dimension being illustrated in FIG. 6. It will be noted that the edge of the gauge 56 is contoured to complement the outer profile of a rim bead and side wall portions of a tire casing 26. In FIG. 6 it is assumed that with respect to the particular tread to be molded on the casing under treatment, the manufacturer has determined that a curing rim of 17 inches in diameter is to be employed.

The operator places the gauge 56 on the tire casing 26 and makes a chalk mark on the exterior of the casing adjacent the 17 inch index line. He then places the casing 26 over the mandrel 29 and swings the casing 26 to the position indicated in FIG. 7 so that the chalk mark is in a line to be contacted by a contact point 57 on a manually movable arm 58. The arm 58 has a downwardly and rearwardly extending arm 59 which is pivoted by the pivot pin 27 and is pivotally connected at its lower end to a rod 60 which is guided at its upper end by a guide 61. An adjustable contactor 62 is mounted on the rod 60 in line to engage a finger 63 which is rigidly connected to the rear end of an indicator shaft 64 on the front end of which is pinned or otherwise secured an indicator 65 (see FIG. 1) which sweeps across an arcuate chart 66 also shown in FIG. 9. A stop 67 for the finger 63 extends rearwardly from the cross member 16 and a coil spring 68 is connected to the finger 63 and to the catch 54 for holding the finger 63 against the stop 67 and resisting the upward movement of the rod 60. Lost motion which allows for the movement of the arm 58 from its rest position (FIG. 2) to its contact position (FIG. 7) is provided for by locating the contactor 62 at a level lower than the rest position of the finger 63.

The position reached by the side wall contacting point 57 when in firm contact with the side wall of the casing 26 at the chalk mark is directly indicated by the indicator 65 on the chart 66 in terms of the clearance between a curing rim of a certain width and the inner surface of the casing side wall when the casing is in position in a particular matrix.

In using the method of the invention embodied in the apparatus described above, the charts 51 and 66 indicate the measurements made by the elements of the operating mechanism, and the resulting movement of the respective indicators 50 and 65 in a manner now to be described. Referring to FIG. 8, the chart 51 is shown as having three main sections indicated by the legends "15 inch bead #1 matrix," "15 inch bead #2 matrix," "15 inch bead #3 matrix." It will be observed in FIG. 8 that the chart reads from #1 matrix to #2 matrix to #3 matrix in a counter-clockwise direction. Study of the mechanism connecting the yoke 19 to the indicator 50 reveals that the larger the tire being measured, the farther down the yoke 19 moves and the farther up the rack rod 45 is moved. This rotates the pinion 48 in a clockwise direction (FIG. 3), which rotates the indicator 50 in a counter-clockwise direction (FIG. 8). It follows that the figures of the chart relating to the #3 matrix have to do with a matrix of larger size suitable for molding a new tread on the exterior of tires of larger size. This is indicated by the three boxed legends appearing in FIG. 8 which relate, respectively, to the three sections of chart 51 having to do with the #1, #2 and #3 matrix. Attention is particularly invited to that portion of the three legends reading respectively, "OD 27⅞ inches," "OD 28⅜ inches" and "OD 29 inches." It is thus possible to ignore the marked nominal size of the tire other than its rim bead diameter (which is fast and hard) and its general size, i.e., whether larger or smaller. The casing is placed upon that one of the mandrels 29 intended for larger or smaller tires as explained above, and the mechanism actuated to pull it downwardly over the mandrel 29. It should be noted, of course, that a chart 51 is necessary for each matrix group. A matrix group would include all matrices having to do with the molding of a particular tread on tires of 15" bead diameters, but actually, suitable for molding in such a matrix would include all tires of substantially the same over-all diameter, not merely the same rim bead diameter.

The particular position to which the indicator 50 swings is read by the operator. For example, in FIG. 8 the indicator 50 indicates that the particular tire being measured is within the range of size to employ the #2 matrix for the particular tread. The indicator 50 points two graduations beyond the center of this area of the chart. This indicates that the tire is larger than average. This point guides the operator in determining whether the rim beads of the tire should be pinched together or separated axially in order to compensatorily decrease or increase the maximum outside dimension of the tire when it is placed in the matrix. The chart in FIG. 9 in this example and the position of the indicator 65 thereon, indicates that the thickness of the side wall of the tire is such that the operator should employ a curing rim having a width of 6⅛ inches, or the "#2" curing rim. Since the diameter of the curing rim has been indicated by the matrix manufacturer as explained above with reference to FIG. 6, the operator chooses that one of the 17 inch curing rims designated as #2 and having a width of 6⅛ inches.

It will be noted that the legends of FIG. 8 also include appropriate instructions for buffing the tire prior to molding, giving the size of the external dimension of the casing to which it is to be buffed, as measured from rim bead to rim bead around the outside of the casing and the width of the tread portion of the casing after buffing. These instructions are based upon the space necessary to be left between the outer surface of the buffed casing and the inner walls of the matrix, and again, are determined by the tread configuration and the actual size of the tire casing and the matrix to be employed.

I claim:

1. Apparatus for measuring the size of pneumatic tire casings, said apparatus comprising, in combination, a mandrel adapted to be inserted into the interior of the body of a casing and into engagement with the inner wall thereof at the peripheral portion thereof for establishing a base point of measurement, said mandrel being rigidly supported against movement in a direction radial of said casing, means for applying force radially of said casing to the rim beads of said casing at the side of said casing remote from said mandrel for radially urging said inner wall of said casing tightly into contact with said mandrel at said base point, gauge means including a feeler engageable with the rim bead of said casing on a line extending diametrically from said base point along the direction of application of force thereto by said force applying means, and at the side of said casing nearer said mandrel an indicator with a chart for indicating the distance between said base point of engagement and the rim bead of said casing on said diametrically extending line in terms of the diameter of the body of said casing, and linkage connecting said feeler and said indicator.

2. Apparatus according to claim 1 in which said mandrel has a body having a circular profile in the plane common to the major axis of said tire casing and said base point of measurement.

3. Apparatus according to claim 2 in which said mandrel has a central slot extending parallel to the major axis of said tire casing and said feeler has two arms movable vertically in said slot and extending therethrough in directions generally parallel to such major axis.

4. Apparatus according to claim 1 and resilient means for urging said feeler into engagement with said rim bead of said tire casing and said indicator toward minimum readings on said chart.

5. Apparatus according to claim 1 in which the means for applying force radially of said tire casing consists of a member engageable with said rim beads at a point diametrically opposed to said base point, and power means for urging said member radially of said casing.

6. Apparatus for measuring the size of a pneumatic tire casing, said apparatus comprising, in combination, a main frame, a rigid support extending forwardly from said frame, an upwardly extending strut on the front of said support, a circular mandrel mounted on said strut with its circular profile lying in a fore and aft direction, said mandrel being of a size adapted to fit into the interior of a casing, a rim bead feeler mounted for vertical movement relative to said mandrel in position to engage the radially inner sides of the rim beads of a casing mounted on said mandrel at the side of said casing nearer said mandrel and along a major radius intersecting the periphery of said mandrel and the normal axis of said casing, a power arm extending forwardly from said frame and adapted to extend through the center rim opening of said casing and to engage the rim beads thereof, means mounting said power arm for translation along such radius, power means for moving said power arm radially away from said mandrel into engagement with said rim beads at the side of said casing remote from said mandrel and for applying force to said rim beads for urging said casing tightly over said mandrel, means for maintaining said rim bead feeler in engagement with said rim bead, an indicator having a chart expressing the distance between the radially outermost point of engagement of said mandrel with said casing and the point of engagement of said feeler with said rim beads in terms of the diameter of the body of said casing, and linkage connecting said feeler and said indicator.

7. Apparatus according to claim 6 and a thickness feeler mounted exteriorly of said casing for movement in a plane of the normal axis of said casing and intersecting said mandrel, means for moving said thickness feeler into engagement with the side wall of said casing opposed to said mandrel, an indicator and chart for indicating the thickness of said casing wall between said feeler and said mandrel, and linkage connecting said thickness feeler and said indicator.

8. A method for measuring the size of pneumatic tire casings, said method comprising, establishing a base point of measurement, placing said tire casing with the inner wall thereof adjacent such base point at the peripheral portion of said casing, urging said casing diametrically away from said base point while maintaining the cross section of said casing substantially circular in a plane through its normal axis and said base point, measuring the distance of movement along said plane of the rim beads of said casing in response to such urging and indicating the distance between said base point and said rim beads in terms of the diameter of the body of said casing.

9. A method according to claim 8 in which the casing is urged radially by engaging the rim bead thereof at the side of said casing remote from said base point with power actuator means movable radially of said casing.

References Cited in the file of this patent

UNITED STATES PATENTS 2,636,277     Hawkinson             Apr. 28, 1953